US012734785B2

(12) United States Patent
Backfolk et al.

(10) Patent No.: US 12,734,785 B2
(45) Date of Patent: Sep. 15, 2026

(54) LAMINATES

(71) Applicant: Stora Enso OYJ, Helsinki (FI)

(72) Inventors: Kaj Backfolk, Villmanstrand (FI); Isto Heiskanen, Imatra (FI); Jukka Kankkunen, Imatra (FI); Anna Nyberg Zetterlund, Karlstad (SE)

(73) Assignee: Stora Enso OYJ, Helsinki (FI)

( * ) Notice: Subject to any disclaimer, the term of this patent is extended or adjusted under 35 U.S.C. 154(b) by 242 days.

(21) Appl. No.: 18/258,274

(22) PCT Filed: Dec. 14, 2021

(86) PCT No.: PCT/IB2021/061694
§ 371 (c)(1),
(2) Date: Jun. 19, 2023

(87) PCT Pub. No.: WO2022/137016
PCT Pub. Date: Jun. 30, 2022

(65) Prior Publication Data

US 2024/0034027 A1 Feb. 1, 2024

(30) Foreign Application Priority Data

Dec. 22, 2020 (SE) .................................... 2051536-7

(51) Int. Cl.
*B32B 7/12* (2006.01)
*B32B 29/00* (2006.01)
*B32B 29/02* (2006.01)
*B32B 37/02* (2006.01)
*B32B 37/12* (2006.01)
*B32B 38/00* (2006.01)

(52) U.S. Cl.
CPC .............. *B32B 7/12* (2013.01); *B32B 29/002* (2013.01); *B32B 29/02* (2013.01); *B32B 37/02* (2013.01); *B32B 37/12* (2013.01); *B32B 38/004* (2013.01); *B32B 2037/1269* (2013.01); *B32B 2260/021* (2013.01); *B32B 2260/046* (2013.01); *B32B 2262/04* (2013.01); *B32B 2305/026* (2013.01); *B32B 2307/538* (2013.01); *B32B 2307/718* (2013.01); *B32B 2317/12* (2013.01)

(58) Field of Classification Search
None
See application file for complete search history.

(56) References Cited

U.S. PATENT DOCUMENTS 10,576,721 B2 3/2020 Neagu et al.
11,458,714 B2 10/2022 Backfolk et al.
2012/0214979 A1* 8/2012 Heiskanen ............ D21H 11/18 536/56
2013/0196116 A1 8/2013 Rueckert et al.
2018/0171189 A1* 6/2018 Ingratta .................. C08F 12/34
2018/0319143 A1 11/2018 Neagu et al.
2019/0024318 A1 1/2019 Backfolk et al.
2019/0291938 A1 9/2019 Backfolk et al.
2020/0318293 A1* 10/2020 Saukkonen ............... C08L 1/02
2022/0002946 A1* 1/2022 Knöös ...................... C08J 7/048

FOREIGN PATENT DOCUMENTS

CA 3045593 A1 6/2018
CN 111386196 A 7/2020
EP 0981668 A1 3/2000
JP 2012011651 A 1/2012
WO 9851862 11/1998
WO WO-2015036930 A1 * 3/2015 ........... B32B 29/005
WO 2019123238 A1 6/2019
WO 2019183870 A1 10/2019
WO 2019226040 A1 11/2019
WO 2020104900 A1 5/2020

OTHER PUBLICATIONS

Extended European Search Report from corresponding European application No. 21909658.3, dated Oct. 17, 2024.
International Search Report from corresponding PCT application No. PCT/IB2021/061694, mailed Jan. 19, 2022.
Gary Chinga-Carrasco, Cellulose fibres, nanofibrils and microfibrils: The morphological sequence of MFC components from a plant physiology and fibre technology point of view, Chinga-Carrasco Nanoscale Research Letters, 2011, 6:417.
D. Fengel, Ultrastructural behaviour of cell wall polysaccharides, TAPPI, 1970, vol. 53, No. 3, pp. 497-503 (abstract only).
Taisei Fine Chemical Co. Ltd.: "Core/shell type self-crosslinking acrylic emulsion UW | Resin products list—Japanese original", Nov. 10, 2025 (Nov. 10, 2025), XP093333913 , URL:https://www.taisei-fc.co.jp/products/ resin/uw.html (4 pages).
Communication from corresponding European application No. 21909658.3 dated Nov. 17, 2025 (9 pages).

* cited by examiner

*Primary Examiner* — Samir Shah
(74) *Attorney, Agent, or Firm* — Greer, Burns & Crain Ltd.

(57) ABSTRACT

The present invention relates to packaging materials in the form of laminates comprising a paper or paperboard substrate and a barrier film. The barrier film is based on microfibrillated cellulose. The laminate comprises a paper or paperboard substrate, wherein the substrate is in contact with a first adhesive layer, which is in contact with a second adhesive layer, which is in contact with the barrier film. The present invention also relates to methods for manufacturing such laminates.

10 Claims, No Drawings

LAMINATES

This application is a U.S. National Phase under 35 U.S.C. § 371 of International Application No. PCT/IB2021/061694, filed Dec. 14, 2021, which claims priority under 35 U.S.C. §§ 119 and 365 to Swedish Application No. 2051536-7 filed Dec. 22, 2020.

TECHNICAL FIELD

The present invention relates to packaging materials in the form of laminates comprising a paper or paperboard substrate and a barrier film. The barrier film is based on microfibrillated cellulose. The laminate has excellent grease barrier properties, good ply-bond strength and contains a high proportion of renewable materials. The present invention also relates to methods for manufacturing such laminates.

BACKGROUND

Coating of paper and paperboard with plastics is often employed to combine the mechanical properties of the paperboard with the barrier and sealing properties of for example a polymer film. In many cases however, the grease barrier properties of the polymer coated paperboard are still insufficient or require the use of non renewable polymer materials.

One alternative to overcome the above problem with providing a packaging material with a barrier coating which at the same time provides good repulpability, is the use of water-soluble polymers such as cellulose derivatives or polyvinyl alcohol. The drawback of these is usually the low solid content and that high coat weights is required. This type of coating concepts also increases the risks for drying-induced stresses and problems with dimensional stability. More recently, microfibrillated cellulose (MFC) films have been developed, in which defibrillated cellulosic fibrils have been suspended e.g. in water and thereafter re-organized and rebonded together to form a dense film with excellent barrier properties. Unfortunately, the barrier properties of such MFC films tend to deteriorate at high humidity and contact with water.

When laminates comprising paper or paperboard substrates and MFC films are prepared, it is essential, but challenging, to obtain adequate adhesion between the substrate and the MFC film, particularly at low adhesive amounts. Furthermore, it is important that the laminate is substantially free from curl and has high dimensional stability, also at high relative humidity.

Thus, there remains a need for improved solutions to provide grease barrier properties to packaging materials in the form of laminates, whilst using as little non-renewable materials as possible.

SUMMARY OF THE INVENTION

It has surprisingly been found that a packaging material in the form of a laminate with excellent grease barrier properties can be produced without the use of high temperatures and using a very high proportion of renewable materials. Surprisingly, it was also found that excellent bending stiffness of the laminate was obtained. Thus, it is an object of the present invention to provide an improved laminate with excellent grease barrier properties and bending stiffness. In addition, it has been found that a laminate can be obtained which has essentially no curl (can for example measured according to the ISO 11556:2005 standard). A particular benefit of the present invention is that a laminate can obtained in which the side having grease barrier properties is substantially free from plastic and suitable for use in contact with food.

The present invention is also directed to a method for preparing the laminate comprising the steps of:

a) providing a paper or paperboard substrate;
b) applying a first adhesive to the paper or paperboard substrate;
c) providing a barrier film comprising at least 50 wt-% microfibrillated cellulose (MFC);
d) applying a second adhesive to the barrier film;
e) laminating together the products of step b) and d) such that the first adhesive layer is brought into contact with the second adhesive layer.

Steps c) and d) can be carried out separately, so that a barrier film is separately provided with the second adhesive and then step e) is carried out.

The present invention is directed to a laminate comprising a paper or paperboard substrate, wherein the substrate is in contact with a first adhesive layer, which is in contact with a second adhesive layer, which is in contact with a barrier film, said barrier film comprising at least 50 wt-% microfibrillated cellulose (MFG).

The present invention is also directed to the use of the laminate as a packaging material.

The present invention is also directed to packaging products comprising the laminate.

DETAILED DESCRIPTION

As used herein, the term paper refers to a material manufactured in thin sheets from the pulp of wood or other fibrous substances comprising cellulose fibers, used for writing, drawing, or printing on, or as packaging material.

As used herein, the term paperboard refers to strong, thick paper or cardboard comprising cellulose fibers used for boxes and other types of packaging. Paperboard can either be bleached or unbleached, coated or uncoated, and produced in a variety of thicknesses, depending on the end use requirements.

The paper or paperboard used as a substrate in accordance with the present invention is prepared using methods known in the art. The paperboard may for example be SBS board, solid bleached board (SBB), solid unbleached board (SUB), folding boxboard (FBB), liners for corrugated boards. It may also be paper such as greaseproof, glassine, parchment, or bag papers.

The paper or paperboard substrate used in the laminate according to the present invention may comprise multiple layers. In one embodiment of the present invention, the paper or paperboard substrate comprises at least 10% recycled material, such as at least 20% or at least 40% or at least 50% or at least 60% or at least 70% recycled material, which can be either pre- or post-consumer reject. A benefit of the laminate according to the present invention is that migration of ink residuals, such as mineral oil or ink constituents or other contaminants, from recycled materials in the substrate into other parts of the laminate is minimized according to the present invention.

MFC has been identified as an interesting component for use in barrier films for paper and paperboard packaging materials. MFC films have been found to provide low oxygen transfer rates at conditions of intermediate temperature and humidity, e.g. at 50% relative humidity and 23° C. Unfortunately, the barrier properties of such MFC films tend to deteriorate significantly at higher temperatures and humidities, e.g. at 85% relative humidity and 38° C., rendering the films unsuitable for many packaging applications in which grease barrier properties are required.

The present inventors have now found that these deficiencies of prior art laminates comprising MFC can be remedied by providing a first adhesive layer and a second adhesive layer between the paper or paperboard substrate and the barrier film.

The adhesives used in accordance with the present invention are adhesives commonly used in the preparation of laminates for use as packaging products. The adhesives are typically provided in liquid form, for example as a dispersion, emulsion or solution. The first adhesive, second adhesive or both may also be provided as a foam. If a foam is used, the density of the foam is preferably less than 1.0 kg/dm$^3$, more preferably less than 0.9 kg/dm$^3$ and most preferably less than 0.8 kg/dm$^3$, such as less than 0.7 kg/dm$^3$. The benefit of using foam is that the amount of transferred liquid can be reduced, thereby reducing the risk of problems with dimensional stability and curl.

The first adhesive layer used according to the present invention is preferably applied to the surface of the paper or paperboard substrate, using methods known in the art. It can be applied at the time of producing the paper or paperboard substrate as an online process or separately, preferably in a printing press. When it is being applied, the first adhesive preferably has a solid content of at least 20 wt-%, preferably at least 30 wt-%, more preferably at least 40 wt-% or at least 50 wt-%. By using an adhesive with such high solid content, the amount of liquid that transfers and migrates into the substrate is minimized and curl of the laminate can be avoided. The amount of the first adhesive layer is in the range of from 1 to 20 gsm, preferably in the range of from 1 to 10 gsm. The amount of liquid (such as water or solvent) applied as part of the first adhesive is preferably less than 10 gsm, more preferably less than 8 gsm, most preferably less than 6 gsm. Preferably, the first adhesive layer is selected such that it adheres well to the substrate. The first adhesive layer is prepared from one or more adhesives and preferably has a high tack level. If more than one adhesive is used in the first adhesive layer, the adhesives may be provided as a mixture or as one or more sublayers in the first adhesive layer. The glass transition temperature of the first adhesive is preferably in the range of between −20° and 60° C., such as between 0° C. and 40° C. or between 0° C. and 20° C. Suitable adhesives include terpolymer-based adhesives, a styrene/acrylate emulsion which may comprise co-binders such as starch, dextrin and also polyvinyl acetate and polyvinyl alcohol dispersions. The first adhesive may also comprise additives such as WVTR chemicals. WVTR chemicals are preferably film forming polymers such as styrene/acrylate emulsion, PVDC, PVOH or modified PVOH polymers, waxes, and/or oil-based emulsions.

The second adhesive layer used according to the present invention is preferably applied to the surface of the barrier film, using methods known in the art. It can be applied at the time of producing the barrier film as an online process or separately. When it is being applied, the second adhesive has a solid content of at least 20 wt-%, preferably at least 30 wt-%. By using an adhesive with such high solid content, the amount of liquid that migrates into the barrier film is minimized and deterioration of the barrier film can be avoided. The amount of the second adhesive layer is in the range of from 1 to 20 gsm, preferably in the range of from 1 to 10 gsm. Preferably, the adhesive or adhesives in the second adhesive layer are not the same as in the first adhesive layer. Preferably, the second adhesive is selected such that it adheres well to the barrier film. The second adhesive layer is prepared from one or more adhesives. Suitable adhesives include terpolymer-based adhesives, a styrene/acrylate emulsion which may comprise co-binders such as starch, dextrin and also polyvinyl acetate and polyvinyl alcohol dispersions. The glass transition temperature of the second adhesive is preferably higher than 30° C., preferably higher than 40° C. The second adhesive layer may optionally be subjected to drying, such as IR drying, before lamination. If more than one adhesive is used in the second adhesive layer, the adhesives may be provided as a mixture or as one or more sublayers in the first adhesive layer. If the second adhesive layer comprises more than one adhesive, it is preferable that the adhesive, or sublayer of adhesive, which faces the barrier film has high resistance to water, to minimize water uptake into the barrier film.

The lamination can be carried out using methods known in the art. The lamination can for example be carried out in a printing press, in which the first adhesive is preferably applied to the paper or paperboard substrate. The second adhesive is preferably applied to the barrier film. Subsequently, the barrier film is laminated onto the paper or paperboard substrate, so that the surfaces of the first and second adhesive layers come into contact with each other and adhere to each other, to obtain the laminate according to the present invention.

According to the present invention, the lamination is carried out at a temperature of between 30° C. and 200° C., preferably at a temperature of between 30° C. and (temperature measured on the barrier surface).

Laminates according to the present invention provide excellent grease barrier properties. Grease barrier properties can be quantified by measuring the KIT value (TAPPI T559) on the barrier film side of the laminate. The laminate according to the present invention preferably has a KIT value of at least 10, such as 11 or 12. The laminate according to the present invention, on the barrier film side (i.e. the side facing away from the substrate and the first adhesive layer and second adhesive layer) typically has a low gloss, preferably below 60, more preferably below 50, even more preferably below 40 and most preferably below 30. The gloss is determined according to the ISO 8254-1 at 75° C.

The barrier film comprises at least 50 wt-% MFC, by weight of the barrier film. The barrier film may also be described as a MFC film. The barrier film preferably has a low water uptake. The density of the barrier film is preferably more than 800 kg/m$^3$ and more preferably more than 850 kg/m$^3$ and most preferably more than 900 kg/m$^3$ or 950 kg/m$^3$, The barrier film preferably comprises less than 15 wt-% inorganic material, more preferably less than 10 wt-% inorganic material.

The barrier film used according to the present invention, before applying adhesive, preferably has a Gurley Hill porosity value, determined according to ISO 5636/6, of at least 2000 s/100 ml, more preferably at least 10000 s/100 ml. The barrier film, before applying adhesive, preferably has PPS10 roughness (determined according to ISO8791-4:2007) larger than 1.5 μm, more preferably larger than 2 μm.

The barrier film used according to the present invention has low oil absorbency. Preferably, the barrier film is omniphobic, i.e. provides a temporary resistance to both water and oil.

The barrier film used according to the present invention, before applying adhesive, preferably has a Cobb value (Cobb 30 s ($H_2O$), determined according to ISO 535:2014 after 30 seconds) of less than 35 g/m$^2$, preferably less than 30 g/m$^2$, more preferably in the range of from 5 to 25 g/m$^2$, such as in the range of from 15 to 25 g/m$^2$.

Microfibrillated cellulose (MFC) shall in the context of the patent application be understood to mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides*, Tappi J., March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregates and cellulose microfibril aggregates. MFC can also be characterized by various physical or physical-chemical properties such as its large surface area or its ability to form a gel-like material at low solids (1-5 wt %) when dispersed in water, The cellulose fiber is preferably fibrillated to such an extent that the final specific surface area of the formed MFC is from about 1 to about 200 m$^2$/g, or more preferably 50-200 m$^2$/g when determined for a freeze-dried material with the BET method.

The MFC used in the barrier film preferably has a FS5 fines level of less than 100, preferably less than 90. The MFC used in the barrier film preferably has FS5 fibrillation index higher than 1.5, more preferably higher than 1.8 or higher than 2.0. The fines level and fibrillation index can be measured using a Valmet FS5 Fiber Image Analyzer.

Various methods exist to make MFC, such as single or multiple pass refining, pre-hydrolysis followed by refining or high shear disintegration or liberation of fibrils. One or several pre-treatment steps are usually required in order to make MFC manufacturing both energy efficient and sustainable. The cellulose fibers of the pulp to be utilized may thus be pre-treated, for example enzymatically or chemically, to hydrolyse or swell the fibers or to reduce the quantity of hemicellulose or lignin. The cellulose fibers may be chemically modified before fibrillation, such that the cellulose molecules contain other (or more) functional groups than found in the native cellulose. Such groups include, among others, carboxymethyl (CMC), aldehyde and/or carboxyl groups (cellulose obtained by N-oxyl mediated oxidation, for example "TEMPO"), quaternary ammonium (cationic cellulose) or phosphoryl groups. After being modified or oxidized in one of the above-described methods, it is easier to disintegrate the fibers into MFC or nanofibrils.

The nanofibrillar cellulose may contain some hemicelluloses, the amount of which is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose, or other chemicals present in wood fibers or in papermaking process. The product might also contain various amounts of micron size fiber particles that have not been efficiently fibrillated.

MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The MFC of the barrier film may be unmodified MFC or chemically modified MFC, or a mixture thereof. Preferably, the MFC is an unmodified MFC. Unmodified MFC refers to MFC made of unmodified or native cellulose fibers. Preferred fiber can be e.g. bleached kraft fiber from either hardwood or softwood or a mixture of these. The unmodified MFC may be a single type of MFC, or it can comprise a mixture of two or more types of MFC, differing e.g., in the choice of cellulose raw material or manufacturing method. Chemically modified MFC refers to MFC made of cellulose fibers that have undergone chemical modification before, during or after fibrillation. In some embodiments, the MFC is a chemically modified MFC. The chemically modified MFC may be a single type of chemically modified MFC, or it can comprise a mixture of two or more types of chemically modified MFC, differing ag, in the type of chemical modification, the choice of cellulose raw material or the manufacturing method.

The barrier film may be comprised solely of MFC, or it can comprise a mixture of MFC and other ingredients or additives. The barrier film includes MFC as its main component based on the total dry weight of the barrier film. The barrier film comprises at least 50 wt %, preferably at least 70 wt %, more preferably at least 80 wt % MFC, based on the total dry weight of the barrier layer.

The barrier film may be prepared as a free-standing MFC film for the lamination to the substrate. The free-standing film is prepared using methods known in the art, such as on a papermaking machine or using techniques such as cast forming. The film may be subjected to treatments such as calendering and/or supercalendering using methods known in the art. The barrier film may include a wide range of ingredients in varying quantities to improve the end performance of the product or processing of the coating. The barrier film may further comprise additives such as polysaccharides and/or cellulose derivatives) (starch, carboxymethyl cellulose, methyl cellulose, hydroxypropylcellulose, hemicellulose), a filler, retention or drainage chemicals, flocculation additives, deflocculating additives, cross-linkers, dry strength additives, humectants, softeners, or mixtures thereof. The barrier film may further comprise additives that will improve different properties of the mixture and/or the produced film such as latex and/or polyvinyl alcohol (PVOH) for enhancing the ductility of the film.

In some embodiments, the barrier film further comprises a polymeric binder. In some embodiments, the barrier film further comprises PVOH. The PVOH may be a single type of PVOH, or it can comprise a mixture of two or more types of PVOH, differing e.g. in degree of hydrolysis or viscosity. The PVOH may for example have a degree of hydrolysis in the range of 80-99 mol %, preferably in the range of 88-99 mol %. Furthermore, the PVOH may preferably have a viscosity above 5 mPa×s in a 4% aqueous solution at 20° C. DIN 53015/JIS K 6726.

In some embodiments, the barrier film further comprises a pigment. The pigment may for example comprise inorganic particles of talcum, silicates, carbonates, alkaline earth metal carbonates and ammonium carbonate, or oxides, such as transition metal oxides and other metal oxides. The pigment may also comprise nano-size pigments such as nanoclays and nanoparticles of layered mineral silicates, for instance selected from the group comprising montmorillonite, bentonite, kaolinite, hectorite and hallyosite.

In some embodiments, the pigment is selected from the group consisting of nanoclays and nanoparticles of layered mineral silicates, more preferably bentonite.

The basis weight (corresponding to the thickness) of the barrier film is preferably in the range of from 15 to 80 gsm (grams per square meter), preferably in the range of from 15 to 50 gsm, more preferably in the range of from 15 to 40 gsm or from 20 to 35 gsm. The basis weight of the barrier film may for example depend on the mode of its manufacture. The barrier film is preferably translucent. The barrier film has preferably been subjected to calendering and/or supercalendering before being used in the laminate according to the present invention.

The barrier film may be coated on one side (the opposite side from the side on which the second adhesive is provided) with a polymer, to adjust dimensional stability. The polymer used is preferably a polysaccharide, cellulose derivative, PVOH, PVOH/Ac, a wax, polyethylene glycol or a latex dispersion. The amount of polymer is preferably in the range of from 1 to 8 gsm, more preferably from 2 to 5 gsm.

The paper or paperboard substrate used in the laminate according to the invention preferably has a basis weight in the range of 20-500 g/m$^2$, more preferably in the range of 80-400 g/m$^2$. The paper or paperboard is optionally coated, such as mineral coated, to improve smoothness and printability. Such mineral coating may be provided on one or both sides of the substrate and is then a part of the substrate in the context of the present invention. The paper or paperboard substrate may be subjected to surface sizing on at least one side of the paper of paperboard. Such surface sizing is then part of the substrate in the context of the present invention.

In some non-limiting embodiments, the laminate according to the present invention has the following general structures:

Paper/first adhesive layer/second adhesive layer/barrier film

Paper/first adhesive layer/second adhesive layer/barrier film/protective polymer layer Protective polymer layer/paper/first adhesive layer/second adhesive layer/barrier film Protective polymer layer/paper/first adhesive layer/second adhesive layer/barrier film/protective polymer layer Paperboard/first adhesive layer/second adhesive layer/barrier film Paperboard/first adhesive layer/second adhesive layer/barrier film/protective polymer layer Protective polymer layer/paperboard/first adhesive layer/second adhesive layer/barrier film Protective polymer layer/paperboard/first adhesive layer/second adhesive layer/barrier film/protective polymer layer.

The protective polymer layer for example comprises a polyolefin or a polyester, such as a biobased polyolefin or polyester or a varnish. The protective polymer layer may comprise one or more polymers. Examples of suitable polymers include polyethylene, PLA and the like. The varnish may for example be a water-based varnish. The protective layer may for example be added by extrusion coating or film lamination. If a varnish is used, it may be added using methods known in the art such as spraying, rotogravure etc.

According to a further aspect of the present invention, there is provided a method for manufacturing a laminate, comprising the steps of:

a) providing a paper or paperboard substrate;
b) applying a first adhesive to the paper or paperboard substrate;
c) providing a barrier film comprising at least 50 wt-% microfibrillated cellulose (MFC);
d) applying a second adhesive to the barrier film;
e) laminating together the products of step b) and d) such that the first adhesive layer is brought into contact with the second adhesive layer.

The lamination can be carried out using methods known in the art.

Steps c) and d) in the method above can be carried out separately, so that a barrier film is separately provided with the second adhesive and then step e) is carried out. In such embodiment, the method for manufacturing the laminate comprises the steps of:

a) providing a paper or paperboard substrate;
b) applying a first adhesive to the paper or paperboard substrate;
c) providing a barrier film comprising at least 50 wt-% microfibrillated cellulose (MFC) on which a second adhesive has been applied;
d) laminating together the products of step b) and c) such that the first adhesive layer is brought into contact with the second adhesive layer.

EXAMPLES

Comparative Example 1

A 2-ply laminate structure was prepared with one adhesive layer using approximately 7 g/m$^2$ of a styrene/acrylate terpolymer adhesive (glass transition point 0° C.) applied with an anilox onto the substrate before pressing and drying together. The plies comprised of 35 gsm brown kraft paper (2×35 gsm). The trial failed since no interply adhesion was obtained due to uneven distribution of the adhesive.

Comparative Example 2

In this case, the above brown 35 gsm kraft paper was glue laminated with same setup as in example 1 but now against an uncoated 32 gsm web comprising MFC. The trial failed because of similar reasons as in example 1. In both cases, the laminates were showing dimensional stability problem due to re-wetting.

Example 3

SBS board with a grammage of 250 gsm, mineral coated on the print side, was provided as substrate.

MFC film with a grammage of 31 gsm was prepared on a papermaking machine and subjected to calendering. On a flexopress, adhesive was applied, in the form of an aqueous dispersion of a terpolymer of vinyl chloride, vinyl acetate and ethylene with solid content of about 50% and pH between 6 and 7. The minimum film formation temperature of the polymer was about 45° C. The adhesive also comprised a WVTR chemical. The adhesive components were provided on the MFC film and dried using IR drying. The total amount of adhesive applied was 5±1 g/m$^2$ and the ratio was 1:3, i.e. the applied amount of terpolymer and the WVTR chemical was 3 times more than the terpolymer.

Lamination was carried out in a lamination unit. A styrene/acrylate terpolymer adhesive was provided on the surface of the SBS board prior to laminating together the substrate and the MFC film. The substrate was laminated to the film such that the adhesive layers on the substrate and film respectively become adhered to each other.

The laminate obtained did not have any visible wrinkles, bubbles or defects.

The KIT value for the laminate was 12, determined according to TAPPI T559.

Chicken fat resistance was determined (a modification of ASTM F119-8, performed at 40° C. and 0% RH) and the laminate was found to provide chicken fat resistance for more than 48 hours.

Gurley Hill porosity for the laminate was determined according to ISO 5636/6 and found to be 42300 s/100 ml, which is the maximum obtainable with the equipment used.

The water vapor transmission rate (WVTR) of the MFC film after applying the adhesive was 80 g/m$^2$/day when measuring according to the ASTM F1249 at 23° C. and 50% RH.

The oxygen transmission rate (OTR) was less than 10 cc/m$^2$/day at 23° C. and 50% RH when measured with Mocon Oxtran 2/22 device according to the standard ASTM D-3985.

To further confirm the quality of the laminates, the cross-directional (upwards, downwards), machine directional (upwards, downwards) and diagonal curls were analyzed for blanks (visual inspection of blanks (with prints) with dimension of 300.5×168 mm). No obvious curl could be detected.

The laminate comprises a high amount of fiber and should be reusable and disintegratable according to PTS RH 021/97 with a reject rate less than 30%, preferably less than 20% and most preferably less than 10%.

The laminate was compared to a reference laminate, in which a plastic film was used instead of the MFC film. It was observed that the curliness of the laminate according to the example above was less than the reference sample.

In view of the above detailed description of the present invention, other modifications and variations will become apparent to those skilled in the art. However, it should be apparent that such other modifications and variations may be effected without departing from the spirit and scope of the invention.

The invention claimed is:

1. A laminate comprising:

a paper or paperboard substrate, wherein the paper or paperboard substrate is in contact with a first adhesive layer, which is in contact with a second adhesive layer, which is in contact with a barrier film, said barrier film comprising at least 50 wt-% microfibrillated cellulose (MFC), wherein a basis weight of the barrier film is in a range of from 15 to 80 gsm, wherein the first adhesive is a terpolymer-based adhesive or a styrene/acrylate emulsion, said first adhesive having a glass transition temperature in the range of between −20° and 60° C., and, wherein the second adhesive is a terpolymer-based adhesive or a styrene/acrylate emulsion, said second adhesive having a glass transition temperature higher than 30° C., wherein the barrier film, before applying any adhesive, has PPS10 roughness larger than 1.5 μm, and, the barrier film, before applying any adhesive, has a Gurley Hill porosity value, determined according to ISO 5636/6, of at least 10000 s/100 ml.

2. The laminate according to claim 1, wherein the barrier film comprises at least 70 wt-% MFC, based on a total dry weight of the barrier film.

3. The laminate according to claim 1, wherein the barrier film further comprises polyvinyl alcohol (PVOH).

4. The laminate according to claim 1, wherein the basis weight of the barrier film is in a range of from 15 to 40 gsm.

5. The laminate according to claim 1, wherein the barrier film has been subjected to calendaring or supercalendering before being used in the laminate.

6. The laminate according to claim 1, wherein the KIT value of the laminate is at least 11.

7. The laminate according to claim 1, wherein the substrate is solid bleached sulfate (SBS) board.

8. The laminate according to claim 1, wherein the barrier film comprises at least 80 wt-% microfibrillated cellulose based on a total dry weight of the barrier film.

9. The laminate according to claim 1, wherein the first adhesive further comprises co-binders.

10. The laminate according to claim 1, wherein the second adhesive further comprises co-binders.

* * * * *